Figure 1:
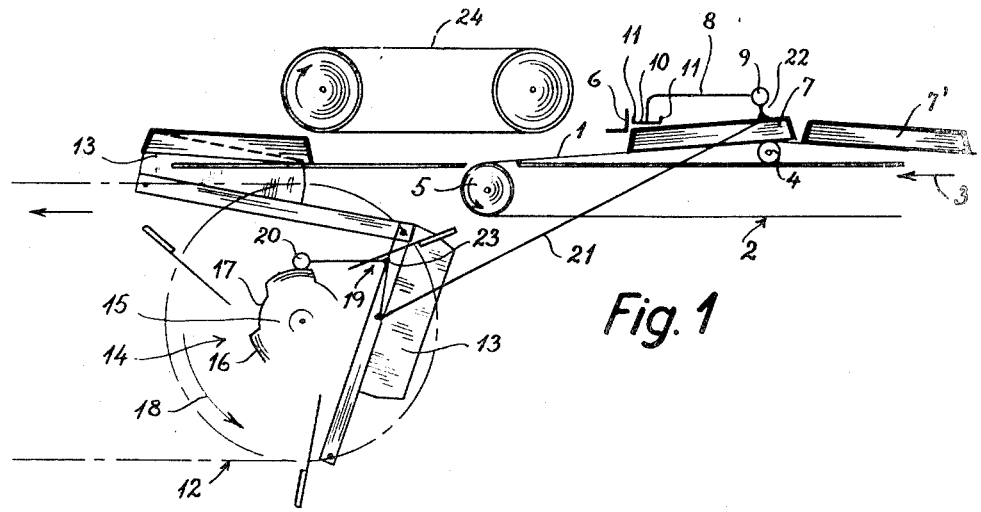

United States Patent

[11] 3,628,652

[72] Inventor Preben E. R. Orstam
    Copenhagen, Denmark
[21] Appl. No. 848,260
[22] Filed Aug. 7, 1969
[45] Patented Dec. 21, 1971
[73] Assignee Skandinavisk Emballage Aktieselskab
    Lyngby, Denmark
[32] Priority Aug. 13, 1968
[33] Denmark
[31] 3911/68

[54] DEVICE FOR CONTINUOUSLY OPERATING BAND CONVEYERS
9 Claims, 3 Drawing Figs.

[52] U.S. Cl. .................................................. 198/34
[51] Int. Cl. ............................................... B65g 47/30
[50] Field of Search ............................... 198/34, 20

[56] References Cited
UNITED STATES PATENTS
2,627,966  2/1953  Moyer ........................ 198/34

*Primary Examiner*—Joseph Wegbreit
*Attorney*—Pennie, Edmonds, Morton, Taylor and Adams ABSTRACT: A device for continuously operating band conveyors to carry on the transport of conveyed objects, e.g. egg cartons, at a preselected distance from one another in the traveling direction, comprising a conveyor band running over support rollers for said band, stop means provided over the upper advancing part of the conveyor band, a pressure member provided over the conveyor band seen in the traveling direction of the band prior to the stop, the said pressure member being adapted to press an object which has arrived at the stop means downwardly so that the said object may advance beneath the stop means.

INVENTOR
Preben E. R. Onstam

DEVICE FOR CONTINUOUSLY OPERATING BAND CONVEYERS

Continuously operating band conveyors have often to carry on the transport of conveyed objects to a preselected distance from one another in the traveling direction, e.g. when egg cartons which are conveyed in close succession from a source of supply thereafter have to be transported at an increased distance from one another to a printing apparatus where they are provided with an imprint. In the following the invention will be explained on the basis of this example.

To meet this requirement according to the invention a stop is provided at a point between revolving rollers of a conveyor band over the upper advancing part of the band normally at a distance from the band smaller than the height of the objects to be conveyed, a pressure member being provided over the conveyor band prior to or in advance of the stop as seen in the traveling direction of the band, which said member can be moved from a position wherein the distance from the lower end of the pressure member to the upper part of the conveyor band is greater than the height of the conveyed objects, and at least to a position wherein the lower end of the member is on a level with that of the stop.

When the pressure member is in its first-mentioned position and an object is advancing, the movement of the object will be arrested by the stop, while the conveyor band continues to move forward below the object. When at a preselected time the object is to be carried further so that a preselected distance from a preceding object is obtained, the pressure member is set in motion and presses the object against the band. Since the stop is arranged at a point between the revolving rollers of the conveyor band, the band will yield to said pressure and the object will be pressed against the band to such an extent that its outermost end is released from the stop. Consequently, the object is pulled out from under the stop by the conveyor band and continues to travel at the desired distance from the preceding object.

According to the invention the stop may be so designed or positioned that it cooperates only with the outermost end portion of the object, facing farthest away from the conveyor band.

This embodiment is particularly advantageous when the objects, e.g., are egg cartons of fiber mass cast on a suction mold. As a rule the cartons are transported with their bottoms facing away from the band, and in all essentials the stop will therefore act on the cartons at a point adjacent the bottom, where in spite of the fragility of the fiber material the cartons are sufficiently resistant to damage by the stop.

According to the invention the pressure member may consist of a swingable arm extending in the longitudinal direction of the conveyor band, the swinging axis of the arm seen in the traveling direction of the conveyor lying prior to or in advance of the stop, the arm extending from said axis towards the stop. Thus, a particularly lenient pressing down of the object is achieved, and when the object is released from the stop it is pulled away from the swingable arm by the conveyor band.

According to the invention the swingable arm may carry on its free end a pressure plate extending across the band conveyor and having rounded edges so as to avoid damage to the object.

According to the invention another conveyor for further transport of the objects may be provided at the rear of the band conveyor as seen in the traveling direction, said conveyor being provided with holding members for the conveyed objects, the objects on this conveyor thus being held at the distance from one another obtained by means of the device described in the foregoing. The pressure member and the second conveyor are expediently synchronously driven, and according to the invention in a simple embodiment of a driving means the swingable arm is driven by an eccentric drive connected to the advancing mechanism of the second conveyor.

Figure 2:
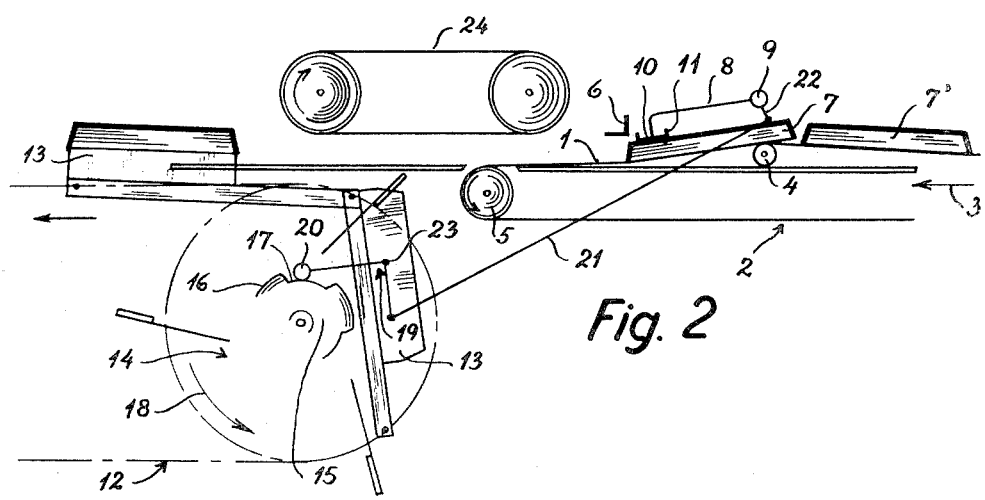
Figure 3:
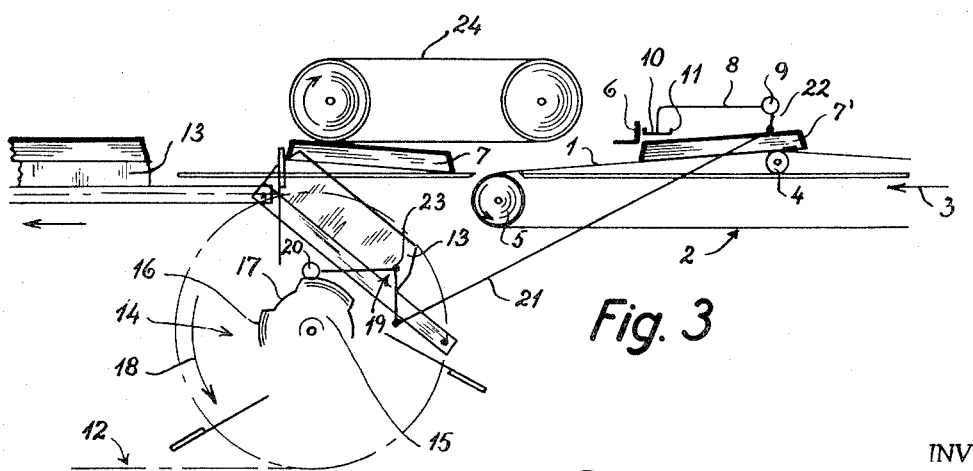

The invention will now be explained in more detail, reference being had to the diagrammatic drawing wherein FIGS. 1-3 show an embodiment of a mechanism according to the invention, FIG. 1 showing the mechanism in a position wherein an object has been arrested by the stop of the mechanism, FIG. 2 showing the same mechanism in the position wherein the object concerned has been pressed away from the stop by a pressure member pertaining to the mechanism, and FIG. 3 showing the released object after having been advanced, at the same time as another object has arrived at the stop.

A stop 6 is positioned above a section 1 of the upper part of a band conveyor 2 at a point between two revolving rollers 4 and 5 for the band, the main traveling direction of section 1 of the conveyor being indicated by an arrow 3, said stop in the form of an angular bar extending across the band. The distance between section 1 of the band and the lower end of the stop 6 in the position shown in FIG. 1 is smaller than the height of an egg carton 7 which is conveyed bottom up, so that the carton 7 with its upper end will impinge on the stop 6, as shown. The drawing shows that section 1 forms an acute angle with the main traveling direction indicated by the arrow 3, or runs at an incline from the roller 4 to roller 5.

A pressure member in the form of a swingable arm 8 is positioned in the traveling direction prior to or in advance of the stop 6, said arm extending in the longitudinal direction of the conveyor band and pointing towards the stop 6, the numeral 9 indicating the shaft of the swingable arm. On its free end the swingable arm 8 carries a pressure plate 10 which has rounded edges 11 extending across the conveyor band.

Another conveyor 12 is positioned at the rear of the band conveyor 2 and is provided with block-shaped holding members 13 for the egg cartons, the cartons being placed on the blocks with their open sides down, as indicated to the left in FIG. 1.

The driving shaft 14 of the conveyor 12 has an eccentric disc 15 having projections 16 and depressions 17. The direction of rotation of the shaft and of the disc is indicated by an arrow 18. An angular arm 19 cooperates with said eccentric disc, one of its legs carrying a roller 20 which bears against the edge of the eccentric disc 15, the other leg being oscillatably connected to a rod 21 which is oscillatably connected to a radial arm 22 fixed to the shaft 9. The numeral 23 indicates the pivot shaft on which the angular arm 19 is oscillated.

According to the invention the section 1 of the conveyor band positioned below the stop 6 may form an acute angle with the main traveling direction of the band conveyor, thus facilitating the work of the pressure member 10.

An endless revolving holding-on band 24 is provided above the junction between the conveyors 2 and 12.

The mode of operation is as follows.

The forward movement of the egg carton 7 on the conveyor band 2 is arrested by the stop 6, and on account of the roller 20 resting on an eccentric projection 16 the pressure plate 10 of the swingable arm 8 is maintained at such a height that the object escapes the pressure plate 10, as shown in FIGS. 1 and 3. The conveyor band moves forward continuously under the egg carton.

Upon continued rotation of the shaft 14 the roller 20 enters a depression 17 whereby the pressure place 10 is swung down until its underside is at least at a level with the lower end of the stop 6, see FIG. 2 in which the underside of the plate 10 is below the level of the bottom of the stop 6. The foremost part of the carton 7 is thereby pressed down, and at the same time section 1 of the band yields to the pressure so that the foremost part of the egg carton arrives below the stop 6. The conveyor band 2 now pulls the carton 7 away from under the stop and carries it towards the conveyor 12. Then the roller 20 will again come to rest on a projection 16, so that the swingable arm 8 with the pressure plate 10 is again swung upwardly, whereupon another carton 7' arrives at the stop 6, see FIG. 3.

In the meantime the carton 7 has been carried forward so far that it is received on a holding member 13. FIGS. 2 and 3 show in particular that the arrangement ensures that a holding member 13 is ready to receive an egg carton every time a carton has been released from the stop by means of the swingable arm 8 and has been carried forward.

The shown mechanism may be used for example as an intermediate unit between a storage pile of egg cartons at the right side of the drawing and a printing machine at the left side of the drawing where each of the cartons will receive an imprint.

It will be understood that the operation of the individual members may also be controlled in other ways, e.g. electrically or pneumatically.

In the shown embodiment the traveling direction is mainly horizontal, but the invention is also useful when the traveling direction is mainly vertical.

Having now fully described my invention I claim as new and desire to secure by Letters Patent:

1. A mechanism for the transport of objects, e.g. egg cartons, and for delivering them at a preselected distance from one another in the direction of travel thereof, comprising a conveyor band running over spaced rollers for supporting the band, stop means provided at a point between the positions of two such spaced-apart rollers for stopping said objects, said stop means being located above the upper section of the conveyor band advancing over said spaced-apart rollers, said stop means being positioned st a distance from the band smaller than the height of the objects to be conveyed thereon, a pressure member located over the conveyor band prior to or in advance of the stop means as seen in the direction of travel of the band, means for moving the pressure member from a position wherein the distance from its lower end to the upper section of the conveyor band is greater than the height of the conveyed objects, and wherein said pressure member is movable by said moving means to a position wherein the lower end of said pressure member is at least as low as the lower part of the stop means thereby permitting the movement of a stopped object below the stop means by the conveyor band.

2. A mechanism as claimed in claim 1, characterized in that the stop means is such that it cooperates only with the outermost end portion of the object facing farthest away from the conveyor band.

3. A mechanism according to claim 1, characterized in that the pressure member comprises a swingable arm extending in the longitudinal direction of the conveyor band and pivoted on an axis located in advance of the stop means as seen from the direction of movement of the conveyor band, said swingable arm extending from said pivot axis toward the stop means.

4. A mechanism according to claim 1, characterized in that a pressure plate is carried on the free end of the swingable arm located toward the stop means, said pressure plate extending above and across the conveyor band and having rounded edges.

5. A mechanism according to claim 1, characterized by including a second conveyor for receiving objects from said conveyor band, holding members located along said second conveyor for receiving objects in succession from the conveyor band.

6. A mechanism according to claim 5, characterized by including a means for driving the conveyor band and the second conveyor in synchronism with each other.

7. A mechanism according to claim 6, characterized in that the second conveyor includes an advancing mechanism including an eccentric drive means, and means actuated by the eccentric drive for moving the swingable arm from one of its positions to the other.

8. A mechanism according to claim 1, characterized in that the section of the conveyor band advancing over said spaced-apart rollers extends at an acute angle with respect to the general course of run of the conveyor band.

9. A mechanism as claimed in claim 1, wherein the pressure member is movable by said moving means to a position engaging an object stopped by said stop means and for depressing it and the conveyor band at the position of the stop means to an extent permitting said band to carry the object under the stop means.

* * * * *